(No Model.) 5 Sheets—Sheet 1.

D. T. PHILLIPS.
CORN HARVESTER.

No. 378,521. Patented Feb. 28, 1888.

Witnesses.
W. Rossiter.
Otto Luebkert.

Inventor,
Darius T. Phillips.
By Wm. H. Lotz,
Atty (No Model.) 5 Sheets—Sheet 4.

D. T. PHILLIPS.
CORN HARVESTER.

No. 378,521. Patented Feb. 28, 1888.

Witnesses,
W. Rossiter.
Otto Luebkert.

Inventor,
Darius T. Phillips.
By Wm. H. Lotz
Atty.

N. PETERS, Photo-Lithographer, Washington, D. C.

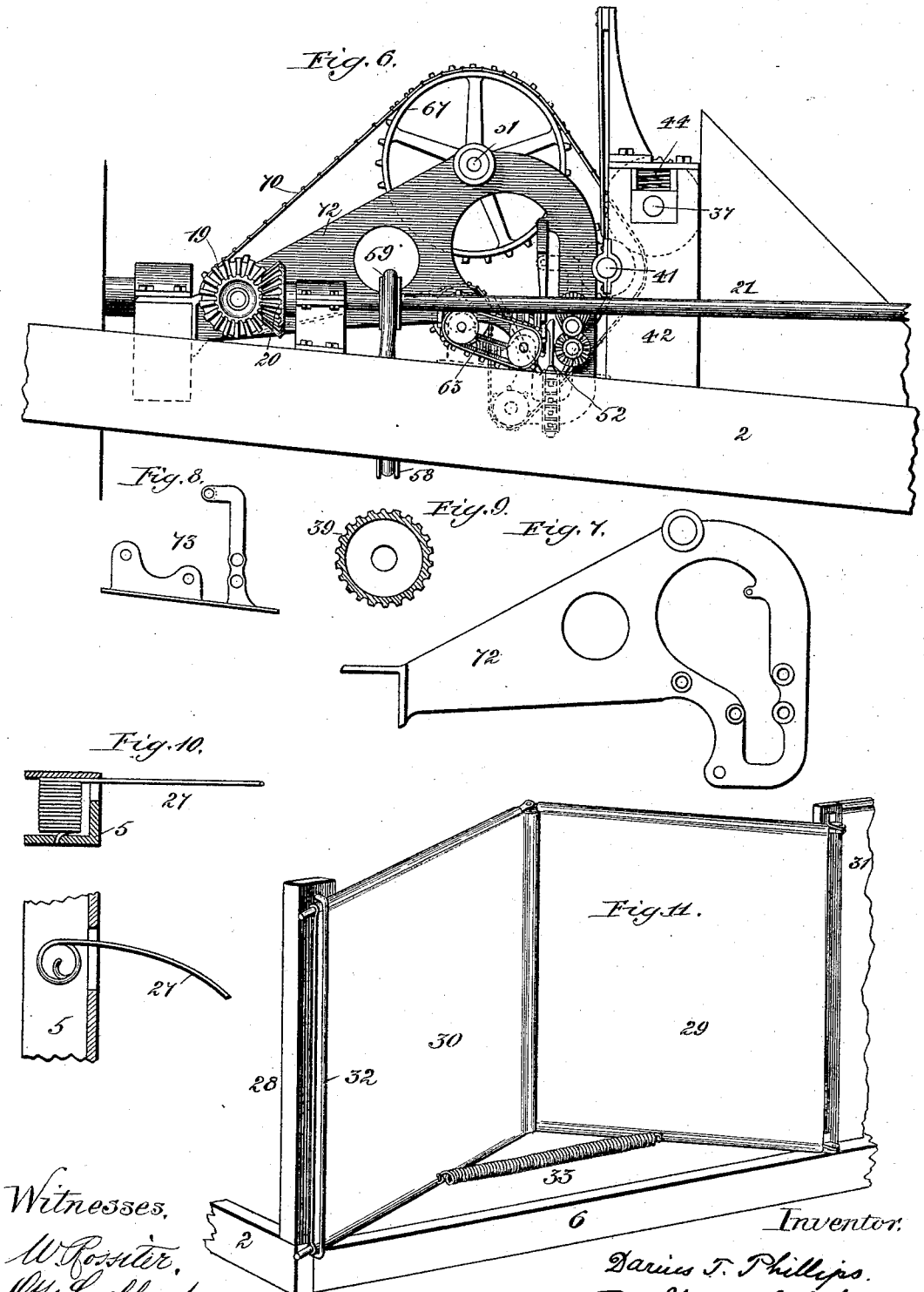

UNITED STATES PATENT OFFICE.

DARIUS T. PHILLIPS, OF CHICAGO, ILLINOIS, ASSIGNOR TO THE PHILLIPS CORN HARVESTER COMPANY, OF SAME PLACE.

CORN-HARVESTER.

SPECIFICATION forming part of Letters Patent No. 378,521, dated February 28, 1888.

Application filed June 26, 1886. Serial No. 206,364. (No model.)

*To all whom it may concern:*

Be it known that I, DARIUS T. PHILLIPS, a citizen of the United States of America, residing at Chicago, in the county of Cook and State of Illinois, have invented certain new and useful Improvements in Corn-Harvesters, of which the following is a specification, reference being had therein to the accompanying drawings.

My invention relates to machines for cutting, husking, and bagging corn, in which the entire round of operations is performed while the machine is being drawn over the ground; and the invention consists in certain improvements, which will be hereinafter described, and pointed out in the claims.

Figure 1:
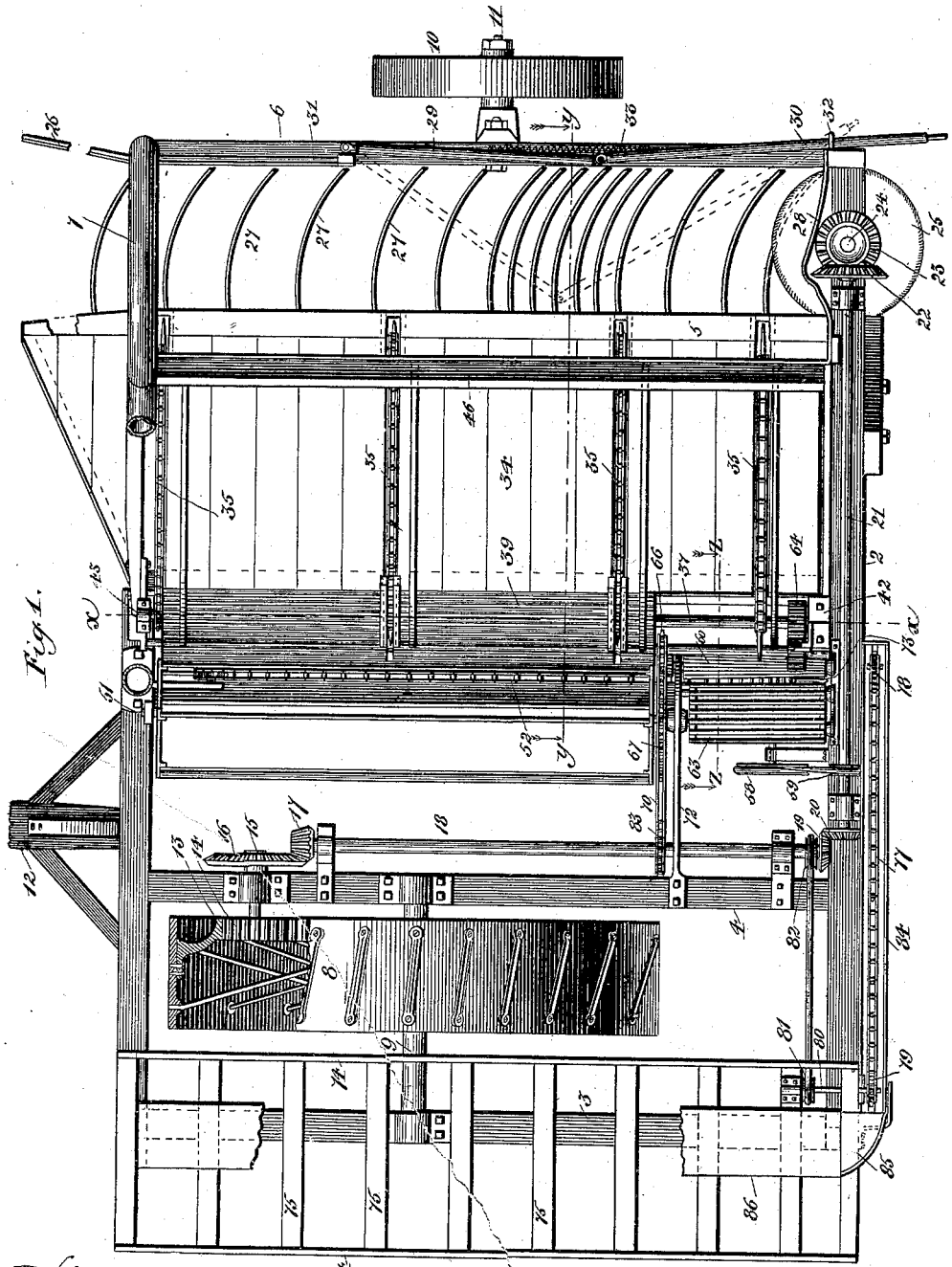
Figure 2:
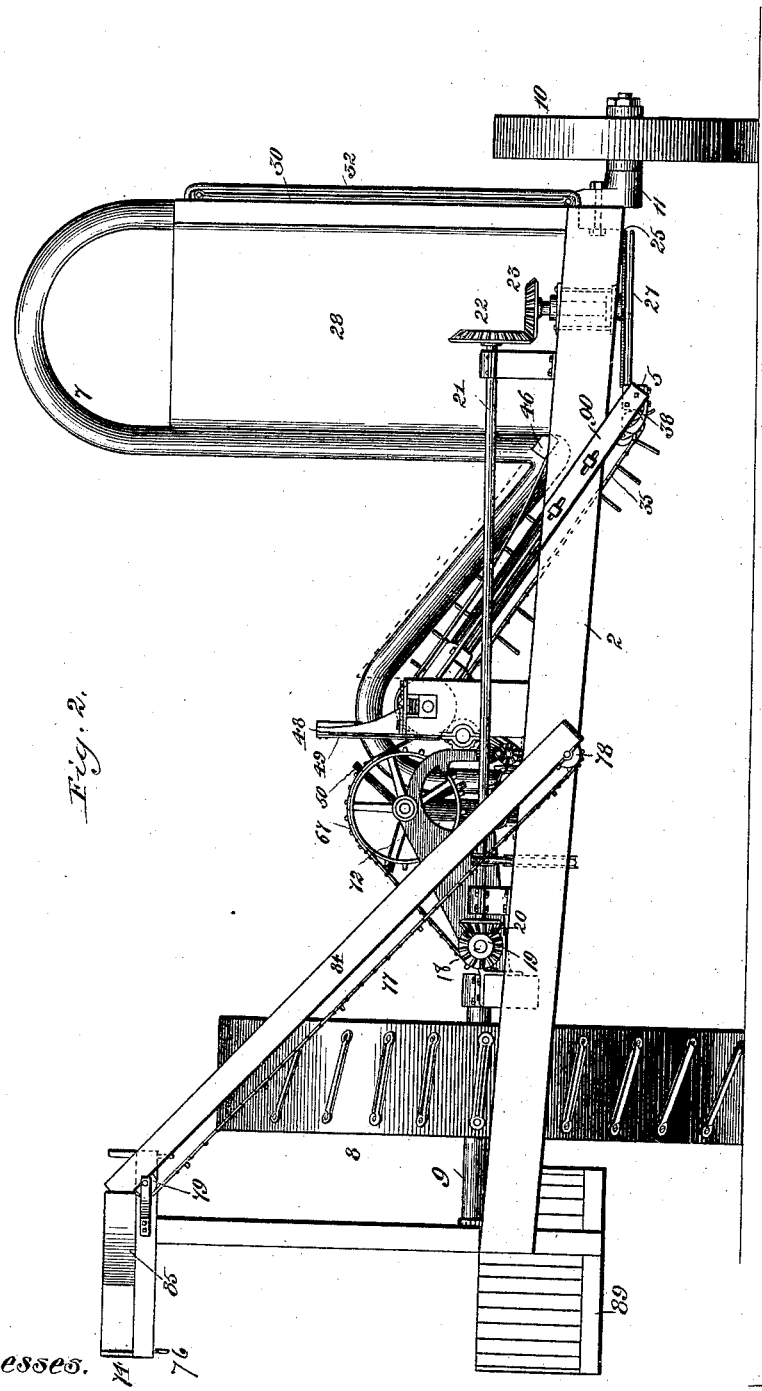
Figure 3:
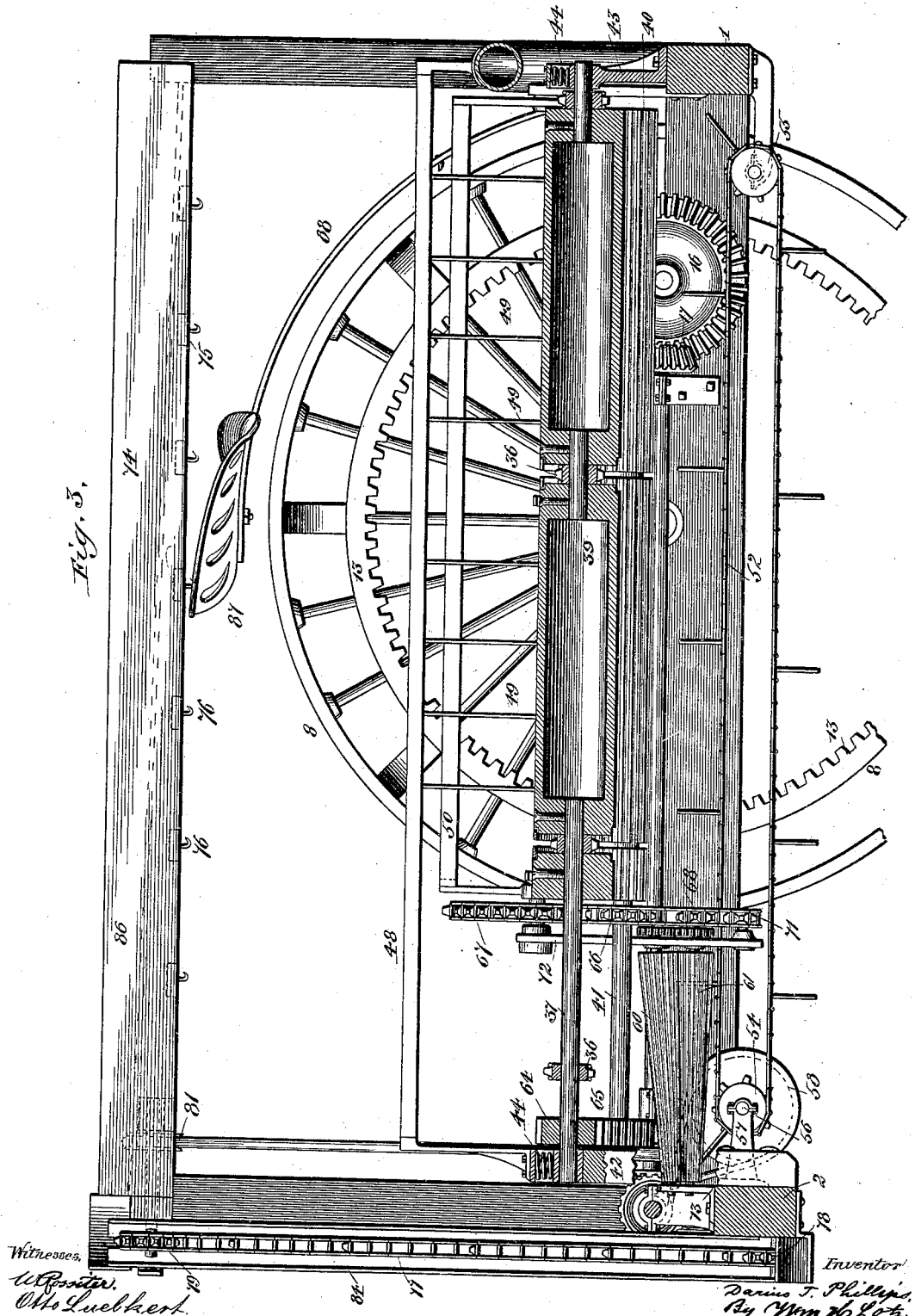
Figure 4:
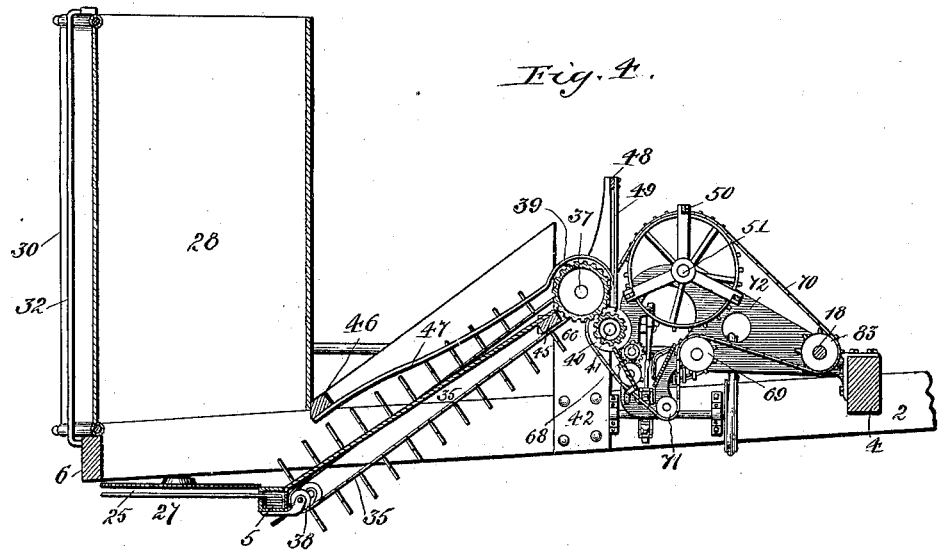
Figure 5:
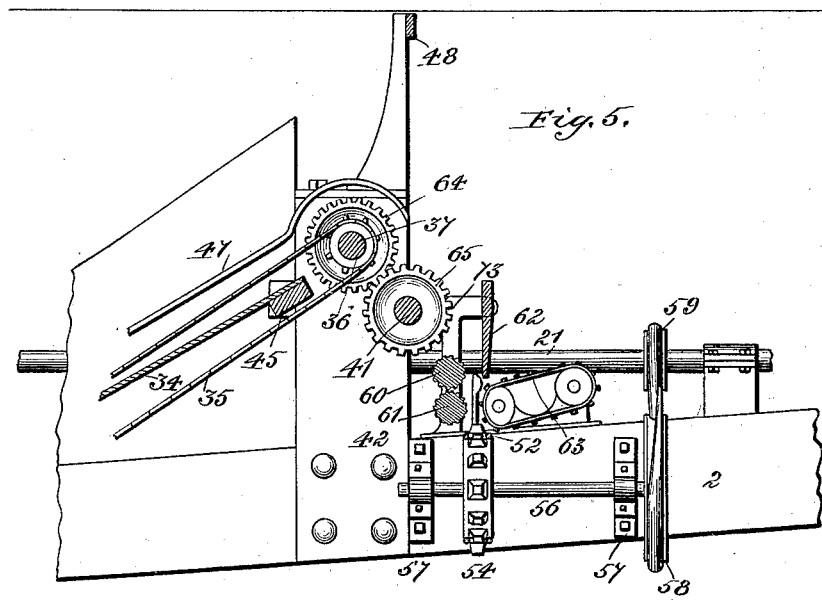

Reference will be made to the accompanying drawings, in which Figure 1 represents a plan view of the machine; Fig. 2, a rear elevation; Fig. 3, a longitudinal vertical section on line $x\ x$ in Fig. 1; Fig. 4, a longitudinal vertical section of part of the machine on line $y\ y$ in Fig. 1; Fig. 5, a similar section on line $z\ z$ in Fig. 1; Fig. 6, a rear elevation of part of the machine on an enlarged scale; Figs. 7, 8, 9, and 10, views of parts detached; and Fig. 11, an elevation of the movable fender-frame for guiding the cornstalks while dropping forward upon the machine.

The same reference-characters designate like parts in the several figures of the drawings.

The main frame of the machine is composed of the front beam, 1, and the rear beam, 2, rigidly connected by two beams, 3 and 4, and by a side beam, 6, connected at one end to the end of rear beam, 2, while its opposite end is connected to the front beam by an arch-shaped brace-bar, 7, made of iron tubing. This frame is supported and transversely inclined by a traction-wheel, 8, mounted upon axle 9, that is journaled in journal-boxes secured upon beams 3 and 4, and by a smaller wheel, 10, journaled upon a short axle, 11, that is secured to beam 6 by a bolt passed through a slotted flange thereof, to be vertically adjustable. To the tongue 12 the horses are hitched that will draw the machine over the field.

The traction-wheel 8 has secured within its rim an internally-toothed gear-wheel, 13, meshing with a pinion, 14, mounted upon shaft 15, that is journaled in a box secured upon beam 4. Upon the other end of shaft 15 is mounted a bevel-gear, 16, meshing with a bevel-pinion, 17, which is mounted upon the end of a shaft, 18, journaled in bracket-bearings that are secured to beam 4. This shaft 18 has mounted upon its opposite end a bevel gear-wheel, 19, meshing with bevel gear-wheel 20, that is mounted upon the end of shaft 21, journaled in bearings which are secured upon beam 2 of the frame. Upon the opposite end of shaft 21 is mounted a bevel-gear, 22, meshing with bevel gear-wheel 23, which is mounted upon the top end of an upright spindle, 24, journaled in a long bearing through beam 2 of the frame. To the bottom end of this spindle 24 is secured the circular cutter 25, that is roughened or file-like on its rim edge, similar to the edge of a file for cutting small chips. By the above arrangement a forward movement of the machine over the ground will impart a rapid rotation to cutter 25.

A beam, 5, is provided at its ends with slotted brackets 90, for securing it by bolts to beams 1 and 2, so that said beam 5 may be adjustable vertically and held in position below the beams 1 and 2, said beam extending from one to the other of said beams. The beam 5 has a forward-slanting extension, which, together with an angularly-projecting guide, 26, secured to the end of beam 6, forms a flaring inlet for cornstalks to enter the machine as they travel under the arch-shaped brace-connection 7. This beam 5 is cast hollow with slotted openings for spring-arms 27, secured in such beam and affording them a free sweep. Each such arm 27 is made of spring-wire coiled to form a spiral spring at the end, which is secured into beam 5, and then shaped to a curved arm reaching up to beam 6. A stalk entering the machine must push each arm rearward until passing by to clear it, when at once, after thus clearing, each arm will reassume its former position, and the several arms together will form a grate that will prevent a cut stalk from dropping upon the ground. The machine thus will move by each stalk until the circular cutter 25 is brought into contact with it to sever it, when at the same time such stalk comes against a vertical shield, 28, rigidly secured upon beam 2 of the frame above the forward side of the cutter, which shield 28 will cause the stalk after being cut to drop forward. But it not only being desirable to have the stalk drop forward, but also sufficiently sidewise toward the left to find its support upon the platform of the machine, I provide a hinged frame which comes in contact with and is pressed to one side by the incoming stalks, and then acts as a guide for them while falling on the elevator. The fender-plates, being drawn back into the position shown in dotted lines, Fig. 1, by the action of the spring 33 as soon as the stalks have passed them, serve, when the stalks are severed by cutter 25 and thrown forward by the progression of the machine, bringing them in contact with the shield 28, to guide or throw the stalks sideward upon the chains or conveyers 35. This frame, as here shown, consists of two fender-plates, 29 and 30, connected by hinges, and plate 29 again hinged to the post of a rigid plate, 31, secured upon beam 6, while the end of plate 30 is guided between the edge of the corner-post of shield 28 and a bar, 32, secured to such shield. These plates 29 and 30 are pushed aside by the stalks, but will at once again be folded by the action of a spring, 33, to assume an angular or folding position toward beam 5, that will guide the stalk when cut to drop in the direction toward and upon a transversely-inclined platform, 34.

The inclined platform 34 is slotted for a series of endless chains, 35, having teeth to their links at proper distance apart and being stretched over sprocket-wheels 36, mounted upon shaft 37, and over rollers 38, journaled in brackets secured to beam 5, by an angular adjustment of which such chains 35 can be tightened. Between sprocket-wheels 36 are mounted, upon shaft 37, sections forming the corrugated roller 39, and a little to one side, below this roller 39 and parallel therewith, is mounted, upon shaft 41, another corrugated roller, 40. Both shafts 37 and 41 are journaled in bearings of standards 42 and 43, and shaft 37 is journaled into boxes vertically sliding in such standards and yieldingly held down by springs 44.

The platform 34 is secured at its lower end to beam 5, and at its upper end it has a longitudinal strip, 45, that is secured between standards 42 and 43. A longitudinal bar, 46, rigidly secured between beams 1 and 2, carries a series of spring-wires, 47, extending over the platform 34, one adjacent to each chain 35 and parallel therewith, the upper ends of which wires being bent to a curve surrounding the upper half of roller 39. To a longitudinal bar, 48, fixed between the upper extremities of standards 42 and 43, are secured the upper ends of pendent wires 49. A cornstalk having been cut off by cutter 25 and dropped upon platform 34, the prongs of endless chains 35 will convey it up the incline under wires 47, which latter will guide it over roller 39 and between such rollers 39 and 40 and the wires 49, which latter by their elastic force will cause the stalk to enter between such rollers and to pass through between the same, whereby some of the ears will be separated, while others are broken off from the stalks by the arms of a reel, 50, moving close by such rollers, which ears will drop upon an endless chain, 52, moving in a trough arranged below and parallel with such rollers 39 and 40, while the stalks, after passing through the rollers, are dropped upon the ground.

The chain 52 is stretched over sprocket-wheels 54 and 55, the driving-wheel 54 of which being mounted upon a shaft, 56, that is journaled between bracket-bearings 57, secured to beam 2, and has also mounted a pulley, 58, to be driven by a belt from a pulley, 59, mounted upon shaft 21. This endless chain 52 has teeth to its links for carrying the ears to a corn-husker embodied in the machine. This cornhusker has been already secured to me by Letters Patent of the United States No. 342,807, bearing date June 1, 1886, and therefore, without giving a close description of its parts and operation, I will only make reference to the principal elements of which it consists.

In this husker, 60 and 61 are the serrated conical rollers, 62 the spring pressure-board, and 63 the endless apron. The shafts 37 and 41 of rollers 39 and 40 have gear-wheels 64 and 65, respectively, that, meshing with each other, will insure a uniform and a simultaneous motion of the same. Shaft 41 has also mounted a sprocket-wheel, 66, for driving such rollers. The shaft 51 of reel 50 has mounted a sprocket-wheel, 67, and the sprocket-wheel 68, driving the conical husking-rollers, and sprocket-wheel 69, driving the apron for the same, together with sprocket-wheel 66, that drives the rollers 39 and 40, are driven from a sprocket-wheel, 83, mounted upon shaft 18, by a link belt, 70, passing over all these sprocket-wheels and over a small tightener-pulley, 71. The cast bearing-plate 72, secured to beam 4 of the frame, furnishes the journal-box for one end of reel-shaft 51 and for the tightener-pulley 71, and the casting 73, bolted upon beam 2 of the frame, together with plate 72, furnishes the journal-bearings for the husker-rollers 60 and 61, for the shafts of the rollers for apron 63, and for the pressure-board 62. On the side opposite to cutter 25 is secured upon the frame of the machine, to be in an elevated position, a shelf consisting of two longitudinal side boards, 74, connected by a series of transverse slats, 75, each such slat having to each end a hook, 76, for suspending bags thereunder in such a manner that the mouth of a bag will be spread to occupy the surface of the entire opening between each two slats 75. An endless chain, 77, is stretched over sprocket-wheels 78 and 79, the latter of which is mounted upon a shaft, 80, having pulley 81, driven by a belt from pulley 82, mounted upon shaft 18. This endless chain 77 moves in a trough, 84, placed on an incline to receive the ears of corn from the husker and to elevate them upon a segmental platform, 85, whence the ears are pushed upon a somewhat inclined board, 86, secured longitudinally over the middle of slats 75, on which board 86, by the motion of the machine, the ears will slide from the rear to the front, and as these ears drop over the edges of such board 86 they will drop into the bags, that will be filled one after the other.

The driver's seat 87 is secured upon a curved bar, 88, that from the front beam of the machine reaches over traction-wheel 8.

Vertically below shelf 74 75 is secured to beam 3 of the frame a box or platform, 89, upon which the bags suspended to hooks 76 may find a support.

What I claim is—

1. In a corn-harvester, the combination, with a cutter located at the rear of the machine, of a shield, substantially as described, for arresting the stalks which then fall forward, and the folding fender-plates hinged together at their meeting ends and located forward of the cutter, normally projected into the line of the incoming stalks in a partially-folded condition, and held so as to be pushed aside by the passage of the stalks and restored as soon as the stalk or hill of stalks is passed, substantially as and for the purpose set forth.

2. In a corn-harvester, the combination, with a circular cutter located at the rear of the machine and with a shield secured above such cutter, of a bed or support located in front of the cutter to receive the severed stalks, an endless apron or elevator located to one side of the bed or support, and folding fender-plates located on the opposite side of said bed or support, said fender-plates being centrally hinged together and hinged at one end to the side frame and working loosely through guides thereon at the other end, and a spring secured to the back of said fender-plates, all substantially as and for the purpose set forth.

3. In a corn-harvester, the combination, with a circular cutter located at the rear of the machine and with a shield secured above such cutter, of a series of spring-arms arranged in front of such cutter, extending across the passage-way for the stalks, said arms having capacity for individually yielding rearwardly to permit the corn to pass them, substantially as and for the purpose set forth.

4. In a corn-harvester, the combination of the following elements: a cutter located at the rear of the machine, endless chains to receive and convey the cut stalks and ears sidewise, rollers 39 and 40, spring guide arms or wires, and a reel arranged at the discharge side of said chains, whereby the ears and stalks carried over the top of the upper roller and the stalks carried back between the two rollers without the ears and at the same time exposed to the action of the reel are separated from the stalks, and suitable gearing for operating the several parts, as set forth.

5. In a corn-harvester, the combination, with a cutter and a receiving grate or support for the cut stalks, of endless chains located to the side of the receiving grate or support, and a pair of separating-rollers, one of said rollers having sprocket-wheels of smaller diameter than the roller-surface at points in its length, and the endless chains working over said sprocket-wheels, and a reel operated close to said rollers at the discharge end of said aprons, as set forth.

6. In a corn-harvester, the combination of the following elements: a cutter, a receiving grate or support for the cut stalks, endless chains to receive the stalks and ears from the grate or support, rollers 39 and 40, and arms or wires which guide the stalks and ears over the top roller and the stalks between the two rollers to separate the ears from the stalks, a separate husking mechanism, an endless chain to receive the detached ears and deliver them to the said husking mechanism, and suitable gearing for operating the several parts.

7. In a corn-harvester, the combination, with the circular cutter 25, journaled to the rear beam, 2, between longitudinal beams 5 and 6 of the frame, and means for operating said cutter, of spring-arms 27, secured to beam 5 and extending across the space between the beams 5 and 6, and permitting the stalks to pass between their free ends and beam 6 by the yielding spring-arms, substantially as set forth.

8. In a corn-harvester, the combination of the following elements: the circular cutter 25, journaled to beam 2 of the frame, and means for operating the cutter, the shield 28, secured above the said beam, and hinged fender-plates 29 and 30, secured upon the side beam, 6, and spring 33, connected to the plates and operating to fold them, in the manner and for the purpose substantially as described.

9. In a corn-harvester, the combination of the following elements: cutter 25, endless chains 35, conveying the cut stalks, rollers 39 and 40, the upper one of said rollers having sprocket-wheels of smaller diameter than itself let in between sections of the said roller, the said endless chains working over said sprocket-wheels, and suitable gearing for operating the parts, as set forth.

10. In a corn-harvester, the combination of the following elements: cutter 25, endless chains 35, located at the side and forward of the cutter and passed over sprocket-wheels 36, interposed between sections of roller 39 and rollers 39 and 40, spring-wires 47, extending up and curved over roller 39, and springs 49, extending down the rear side of roller 39, as set forth.

11. In a corn-harvester, the combination of the following elements: cutter 25, endless chains 35, rollers 39 and 40, reel 50, endless chain 52, located beneath the rollers 39 and 40 and carrying the corn to and along the husking-rollers, and suitable gearing for operating the parts, as set forth.

12. In a corn-harvester, the combination, with a husker, of the elevator 77, a platform composed of side boards, 74, and transverse slats 75, having hooks 76 on the under side, and the board 86, inclined downward from its receiving end, whereby a series of sacks are held open and filled, as set forth.

13. In a corn-harvester, the combination, with a husker, of the elevator 77, segmental platform 85, platform 74 75, and board 86, inclined downward from its receiving end, substantially as and for the purpose set forth.

In testimony whereof I affix my signature in presence of two witnesses.

DARIUS T. PHILLIPS.

Witnesses:
OTTO LUEBKERT,
HARRIS W. HUEHL.